J. B. CROWELL.
Fertilizer.
No. 38,949.
Patented June 23, 1863.
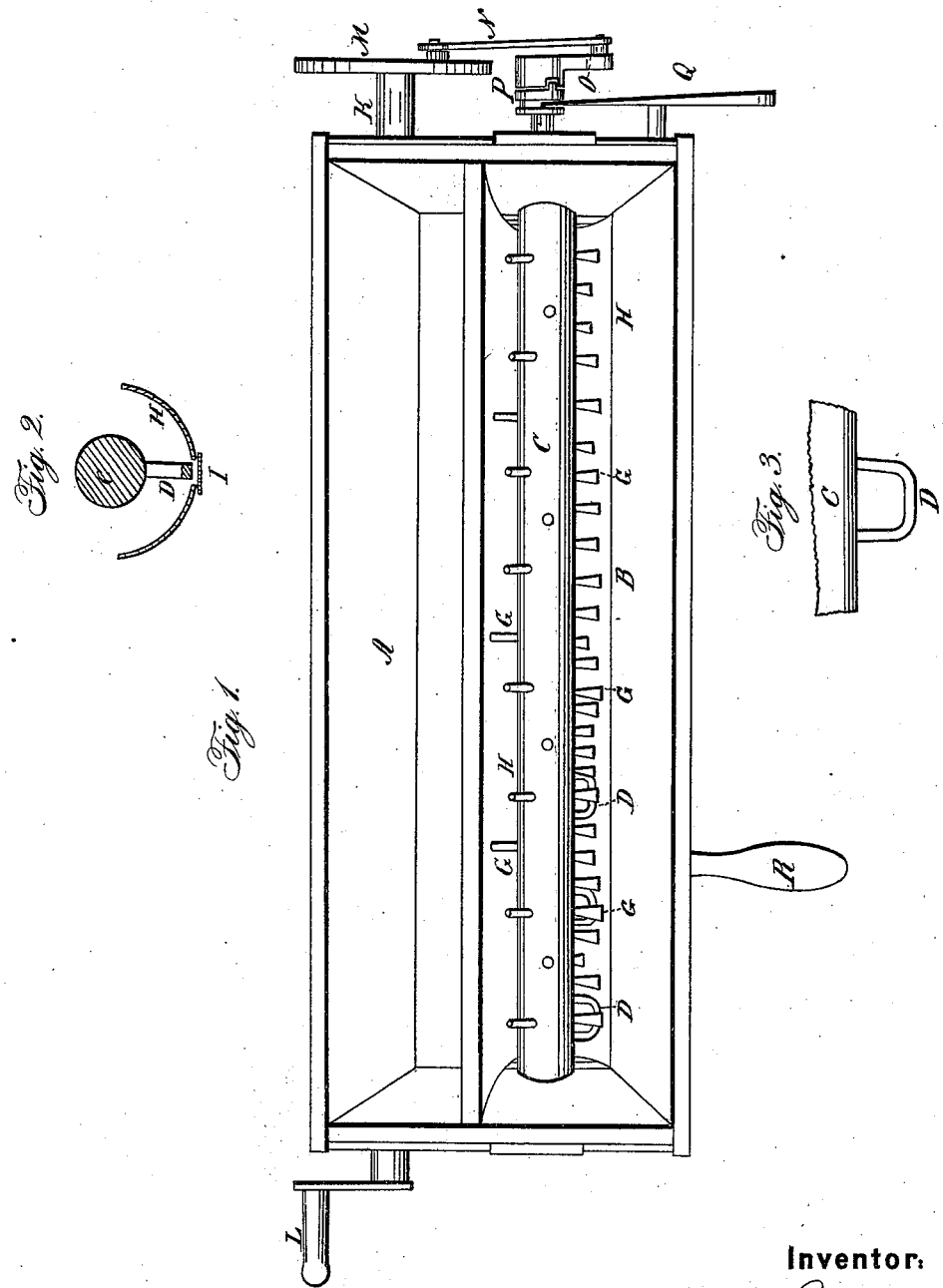
Witnesses:
G. Bread
M. Robinson
Inventor:
Jacob B. Crowell
per
Daniel Breed Atty

UNITED STATES PATENT OFFICE.

JACOB B. CROWELL, OF GREENCASTLE, PENNSYLVANIA.

IMPROVEMENT IN MANURE-DISTRIBUTERS.

Specification forming part of Letters Patent No. 38,949, dated June 23, 1863.

*To all whom it may concern:*

Be it known that I, JACOB B. CROWELL, of Greencastle, in the county of Franklin and State of Pennsylvania, have invented a new and useful Improvement in Fertilizer Attachments to Seed-Planters; and I do hereby declare that the following is a full and exact description thereof, reference being had to the accompanying drawings, and to the letters of reference marked thereon.

My invention consists in an improved arrangement of stirrers and gearing in connection with a curved metallic bottom to the hopper for sowing fertilizers.

In the accompanying drawings, Figure 1 is a top view of a double hopper with my improvements attached. Figs. 2 and 3 are views of detached parts.

The hopper of the machine may have the same general form of those intended for sowing wheat and guano or other fertilizers at the same time. The hopper, as shown in the drawings, has two divisions, the part A being intended for wheat or seed of any kind and the part B for guano or other fertilizer. In the hopper B there is a rock-shaft, C, provided with a series of spikes, G, some of which are flattened in order better to push the fertilizer down into the bottom of the hopper. On the under side of this rock-shaft is a series of stirrups or wipers, which swing back and forth across the feed or discharge openings in the bottom of the hopper. These stirrups are partially seen at D, Fig. 1, and a full side view of one of them is presented in Fig. 3. Their relation to the hopper is better shown in Fig. 2, which is a cross-section through the rock-shaft C, the metallic plate H, the stirrup D, and feed-slide I. The stirrup in this figure is cut through its center. There is a stirrup or wiper at every feed or discharge hole, so that the wipers sweep directly over these holes, as seen at Fig. 2, *s* being the discharge-opening. The wipers also sweep up the sides of the metallic plate H as the shaft C is rocked back and forth. These stirrups are made of wire, and the spikes may be made of the same, both being thus cheaply made. A spike is set on each side of the wiper or stirrup, just opposite the loop or opening of the wiper. The flattened spikes G swing down the sides of the hopper to the points reached by the wipers at every stroke of the rock-shaft C. By this arrangement the feeding is very complete, the spikes preventing any arching above or around the rock-shaft, the flat spikes carrying the fertilizer down to the bottom of the hopper and the wipers pressing it through the feed-holes. The feed-slide I regulates the discharge of the fertilizer, it being worked by the lever R in the usual manner, so as to make the feed-holes larger or smaller, or close them at pleasure. This slide I works close up to the metallic plate H, Fig. 2, so as to leave no room for clogging (between the movable slide and the movable wiper D) in the feed-hole S. This is much better than having the feed-hole in the wooden bottom of the hopper, because the guano (especially when damp) is liable to adhere to the sides of the feed-holes and clog the same when made of wood instead of metal. For the same reason the curved metallic bottom is an improvement, as fertilizers do not readily adhere to metal, as they are liable to do with wooden-bottomed hoppers. And the action of the wipers tends to keep the metallic plate bright and smooth by the constant wear.

The shaft K and crank L are not employed in the full-sized machine. The wheel M in the working machine may be a cog-wheel, to which the pitman N is attached, motion being given by the traveling wheels of the machine. This pitman is attached to crank O, thus imparting motion to the latter. The crank O is connected to the axle of shaft C by a loose collar, so as to turn freely when desired. A movable clutch, P, operated by lever Q, is employed to fix the crank O at pleasure, so as to make the shaft C operate or to suspend its action at pleasure. When the rock-shaft is operating not only the wipers D, but also two sets of spikes, are carried past the feed-holes S. Thus six strokes of these feeders are made past the feed-holes at every revolution of axle K. The reciprocating action of the rock-shaft, by changing the motion of the stirrers, prevents the clogging of guano or other fertilizer upon shaft C and the spikes G, as might be the case if the shaft and spikes were revolved constantly in one direction.

I do not broadly claim the separate mechanical devices employed in my machine, but limit my claims to the new combinations and arrangements of such devices and the new effects thereby produced; and I believe these are important and patentable improvements.

Having thus fully described my invention, what I claim, and desire to secure by Letters Patent of the United States, is—

1. The rocking shaft provided with the stirrers H and G and the wipers D, in the manner and for the purposes set forth.

2. In combination with the rocking shaft, as described, the clutch P, crank O, and pitman N, all constructed and operating in the manner and for the purposes specified.

JACOB B. CROWELL.

Witnesses:
 DANIEL BREED,
 GULIELMA BREED.